US008308594B2

(12) United States Patent
Grosser

(10) Patent No.: US 8,308,594 B2
(45) Date of Patent: Nov. 13, 2012

(54) DRIVETRAIN WITH ENGINE, TRANSMISSION, PLANETARY GEAR SET AND ELECTRIC MACHINE

(75) Inventor: Danny Eckhard Grosser, Eppelheim (DE)

(73) Assignee: Borgwarner Inc., Auburn Hills, MI (US)

( * ) Notice: Subject to any disclaimer, the term of this patent is extended or adjusted under 35 U.S.C. 154(b) by 171 days.

(21) Appl. No.: 12/831,461

(22) Filed: Jul. 7, 2010

(65) Prior Publication Data

US 2011/0015020 A1 Jan. 20, 2011

(30) Foreign Application Priority Data

Jul. 20, 2009 (DE) ........................ 10 2009 033 962

(51) Int. Cl.
*F16H 3/72* (2006.01)
*F16H 37/06* (2006.01)
*F16H 3/44* (2006.01)

(52) U.S. Cl. ........................................... 475/5; 475/323

(58) Field of Classification Search ............... 475/5, 323
See application file for complete search history.

(56) References Cited

U.S. PATENT DOCUMENTS 6,048,288 A * 4/2000 Tsujii et al. ........................ 477/5
6,878,094 B2 * 4/2005 Kitamura et al. ................. 477/5
7,028,794 B2 * 4/2006 Odahara et al. ............ 180/65.25

FOREIGN PATENT DOCUMENTS

DE 101 02 015 A1 7/2002

* cited by examiner

*Primary Examiner* — Roger Pang
*Assistant Examiner* — Colby M Hansen
(74) *Attorney, Agent, or Firm* — Warn Partners, P.C.

(57) ABSTRACT

A drivetrain for a hybrid electric vehicle is provided. The drivetrain includes a motor-generator connected to an engine shaft and transmission via a planetary gear set.

11 Claims, 4 Drawing Sheets

DRIVETRAIN WITH ENGINE, TRANSMISSION, PLANETARY GEAR SET AND ELECTRIC MACHINE

CROSS-REFERENCE TO RELATED APPLICATIONS

This application claims the benefit of German Patent Application No. 102009033962.0, filed Jul. 20, 2009, the contents of which are incorporated by reference in their entirety.

STATEMENT REGARDING FEDERALLY SPONSORED RESEARCH OR DEVELOPMENT

Not Applicable.

THE NAMES OF THE PARTIES TO JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The present invention relates to a drivetrain for a motor vehicle, having an engine which has a drivable engine shaft, having a transmission whose transmission input shaft is in rotationally driving connection with the engine shaft, having an electric machine which can be operated in a generator mode and a starter mode, and having a planetary gear set which has three elements, specifically a sun gear, a planet gear carrier with planet gear carriers, and a ring gear, of which a first element is in rotationally driving connection with the engine shaft, a second element is in rotationally driving connection with the rotor, and a third element can be fixed by means of a first actuating device to a stationary housing, with a second actuating device also being provided which can interact with at least one of the elements in such a way that the planetary gear set performs a block rotation.

BACKGROUND OF THE INVENTION

De 101 02 015 A1 discloses a drivetrain of the generic type. The drivetrain described in said document for a motor vehicle has an engine with a drivable engine shaft or crankshaft, with the engine shaft having a first axial direction. The known drivetrain also comprises a transmission which has a transmission input shaft which is in rotationally driving connection with the engine shaft. Here, the transmission is arranged behind the engine in the first axial direction. Furthermore, the known drivetrain comprises an electric machine with a rotor and a stator, with it being possible for the electric machine to be operated in a generator mode, in which electrical energy can be generated utilizing a relative movement between the rotor and the stator, and a starter mode, in which electrical energy can be converted into a relative movement between the rotor and the stator. Here, the electric machine is coupled by means of a planetary gear set to the engine shaft. The planetary gear set substantially comprises a sun gear, a planet gear carrier with planet gears, and ring gear. The planet gear carrier, which forms the drive input side of the planetary gear set in the generator mode and forms the drive output side of the planetary gear set in the starter mode, is in rotationally driving connection with the engine shaft, while the ring gear, which forms the drive output side of the planetary gear set in the generator mode and forms the drive input side of the planetary gear set in the starter mode, is in rotationally driving connection with the rotor of the electric machine. The sun gear of the planetary gear set can be connected by means of a first actuating device in the form of a freewheel to the stationary housing of the engine in the starter mode of the electric machine. Also provided is a second actuating device in the form of a further freewheel which, in the generator mode, acts between the planet gear carrier and the ring gear in such a way that the planet gear carrier and the ring gear are fixed with respect to one another and the planetary gear set therefore performs a block rotation. In the known drivetrain, the planetary gear set is likewise arranged, together with the electric machine, behind the engine in the first axial direction. More precisely, the planetary gear set is arranged, in the first axial direction, behind the engine and in front of the transmission which likewise follows in the first axial direction.

SUMMARY OF THE INVENTION

The known drivetrain is disadvantageous because involves particularly high assembly and maintenance expenditure, in particular with regard to the electric machine and the planetary gear set. On account of the transmission ratio, which is changed by the planetary gear set, between the rotor of the electric machine and the engine shaft in the starter mode, it is duly possible for the electric components of the electric machine to be dimensioned to be smaller, but said components must still be designed to be relatively large in order to effect a start of the engine or a rotation of the engine shaft in the starter mode. The electric machine of the known drivetrain therefore still has a relatively high weight and requires a large installation space.

It is therefore an object of the present invention to provide a drivetrain of the generic type which ensures particularly low assembly and maintenance expenditure with regard to the planetary gear set and the electric machine and which, in a particularly preferred embodiment, enables the use of a particularly small and cost-effective electric machine with a low weight.

Said object is achieved by means of the features specified in patent claim 1. The subclaims relate to advantageous embodiments of the invention.

The drivetrain according to the invention for a motor vehicle has an engine, preferably an internal combustion engine, a transmission, an electric machine, preferably an alternator, and a planetary gear set, which will be rendered more precisely below. The engine has a drivable engine shaft, which is preferably the crankshaft of the engine. The engine shaft or the alignment thereof gives the engine a first axial direction and a second axial direction opposite to the first axial direction. The transmission has at least one transmission input shaft which is in direct or indirect rotationally driving connection with the engine shaft. The above mentioned electric machine has a rotor and a stator, with the rotor being rotatable relative to the stator. The electric machine can thus be operated in a generator mode, in which electrical energy is generated utilizing a relative movement between the rotor and the stator, and a starter mode in which electrical energy is converted into a relative movement between the rotor and the stator. The planetary gear set has substantially three elements, specifically a sun gear, a planet gear carrier with rotatable planet gears arranged thereon, and a ring gear. A first element of said three elements of the planetary gear set, which first element forms the drive input side of the planetary gear set in the generator mode of the electric machine and forms the drive output side of the planetary gear set in the starter mode of the electric machine, is in indirect or direct rotationally driving connection with the engine shaft. A second element of said three elements of the planetary gear set, which second element forms the drive output side of the planetary gear set in the generator mode of the electric machine and forms the drive input side of the planetary gear set in the starter mode of the electric machine, is in contrast in indirect or direct rotationally driving connection with the rotor of the electric machine. The remaining third element of the above mentioned three elements of the planetary gear set can, in the starter mode of the electric machine, be fixed by means of a first actuating device to a stationary housing, such that said third element can no longer be rotated. Also provided is a second actuating device which, in the generator mode of the electric machine, interacts with at least one of said three elements in such a way that the planetary gear set performs a block rotation, or the rotational speed of the drive input side and the rotational speed of the drive output side of the planetary gear set correspond. The transmission of the drivetrain according to the invention is arranged behind the engine in the axial direction, with this encompassing both arrangements in which the transmission itself is arranged behind the engine in the first axial direction and also arrangements in which merely a coupling arrangement between the engine shaft and the transmission shaft is arranged behind the engine in the first axial direction. Furthermore, the above mentioned planetary gear set is arranged in front of the engine in said first axial direction. Said arrangement also comprises both arrangements in which the planetary gear set is arranged directly in front of the engine in the first axial direction and also arrangements in which a coupling arrangement, which may if appropriate be provided, between the engine shaft and the planetary gear set is arranged in front of the engine in the first axial direction. Furthermore, this also encompasses arrangements in which the planetary gear set is duly entirely or partially integrated into the engine or the housing thereof but is arranged in front of the major region of the engine in the first axial direction. It is also possible to say here that the planetary gear set, or the coupling arrangement between the planetary gear set and the engine, and the transmission, or the coupling arrangement between the transmission and the engine, are arranged on mutually opposite sides of the engine. This should preferably be understood to mean that the planetary gear set is arranged on the control side of the engine and the transmission is arranged on the drive output side of the engine.

In contrast to the drivetrain known from DE 101 02 015 A1, the planetary gear set, or the coupling arrangement between the planetary gear set and the engine, is arranged in front of the engine in the first axial direction, and no longer together with the transmission behind the engine in the first axial direction. The planetary gear set is therefore also no longer arranged between the engine at one side and the transmission at the other side, as is the case in the drivetrain according to DE 101 02 015 A1. This provides significantly improved accessibility to the planetary gear set, as a result of which the mounting, dismounting and maintenance of said planetary gear set are simplified considerably, which can be attributed in particular to the lower number of interfaces. Furthermore, more flexible positioning of the electric machine is possible, which electric machine may be placed in operative connection with the second element of the planetary gear set for example by means of a traction mechanism drive, as will be explained further below with reference to a preferred embodiment. The mounting, dismounting and maintenance of the electric machine are also simplified in the drivetrain according to the invention.

In one advantageous embodiment of the drivetrain according to the invention, the first element of the planetary gear set is in rotationally driving connection with a first end of the engine shaft of the engine, and the transmission input shaft of the transmission is in rotationally driving connection with the second end, which faces away from the first end, of the engine shaft. In this embodiment, too, the respective rotationally driving connection may take place directly or indirectly via a coupling arrangement which may be provided if appropriate. As already mentioned above, said relocation of the planetary gear set to that side of the engine which faces away from the transmission provides better accessibility to the planetary gear set, as a result of which the mounting, dismounting and maintenance expenditure is reduced.

According to a further advantageous embodiment of the drivetrain according to the invention, the engine has an engine housing. As already indicated in the introduction, the planetary gear set could fundamentally also be arranged partially or entirely within the engine housing and/or a further housing which may if appropriate be fastened to the engine housing. This would have the advantage that the planetary gear set could particularly easily utilize the cooling and lubricant circuit within the engine housing, but this is associated with the disadvantage that access to the planetary gear set in the event of maintenance is hindered. For this reason, it is preferable in this embodiment for the planetary gear set to be arranged outside the engine housing and/or outside a further housing which may if appropriate be fastened to the engine housing. In this way, the connection of the planetary gear set to the rotor of the electric machine by means of a traction mechanism drive is also simplified, with a more flexible arrangement of the electric machine also being possible.

According to a further advantageous embodiment of the drivetrain according to the invention, the third element can be fixed by means of the first actuating device to the engine housing in the starter mode, that is to say the engine housing forms the stationary housing mentioned above.

To enable a particularly flexible arrangement of the electric machine which does not entail any restrictions in the design of the engine and/or of the planetary gear set, the second element of the planetary gear set and the rotor of the electric machine are not arranged coaxially, with the second element and the rotor being in rotationally driving connection with one another via a coupling arrangement. The coupling arrangement may for example be a gearwheel drive, but the embodiment described below is fundamentally preferred.

In a particularly preferred embodiment of the drivetrain according to the invention, to keep the design of the coupling arrangement between the second element of the planetary gear set and the rotor of the electric machine particularly simple, the coupling arrangement is formed by a traction mechanism drive. In this embodiment, consideration is given both to non-positively locking and also positively locking traction mechanism drives. The associated traction mechanism may for example be a flat belt, V-belt, timing belt or chain. In this embodiment, however, it is preferable for the traction mechanism to be designed not as a chain but rather as a belt. In any case, the traction mechanism drive makes it possible to overcome a large spacing between the axis of the second element of the planetary gear set and the axis of the rotor of the electric machine while at the same time providing a simple and space-saving design, such that a particularly flexible arrangement of the electric machine is possible. Furthermore, the traction mechanism may be used in a particularly simple manner for driving further components of the engine, such as for example the camshaft for valve control.

In a further preferred embodiment of the drivetrain according to the invention, the traction mechanism drive has a planetary-gear-set-side wheel around which the traction mechanism, preferably the belt, is wrapped and which is in rotationally driving connection with the second element of the planetary gear set. Here, it is preferable if the planetary-gear-set-side wheel of the traction mechanism drive is formed in one piece with the second element of the planetary gear set, which accordingly means that the second element of the planetary gear set is itself formed as the planetary-gear-set-side wheel which is associated with the traction mechanism drive.

In a further particularly preferred embodiment of the drivetrain according to the invention which is based on the embodiment described above, the planetary-gear-set-side wheel of the traction mechanism drive is designed so as to surround a closed lubricant chamber within which the elements of the planetary gear set are arranged. In this embodiment, therefore, adequate and reliable lubrication and cooling of the planetary gear set is possible even if said planetary gear set is arranged outside the engine housing and/or outside a further housing which may if appropriate be fastened to the engine housing, and there is therefore no flow connection between the cooling and lubricant circuit within the engine or engine housing and the lubricant chamber within the planetary-gear-set-side wheel. Such a flow connection is however likewise possible, for example by virtue of a corresponding flow connection being provided between the lubricant chamber within the planetary-gear-set-side wheel and the interior space of the engine housing. To obtain simple mounting and dismounting, however, the former design variant is preferable, in which the lubricant chamber within the planetary-gear-set-side wheel is delimited with respect to the cooling and lubricant circuit within the engine.

In a further advantageous embodiment of the drivetrain according to the invention, the traction mechanism drive has a rotor-side wheel around which the traction mechanism is wrapped and which is in rotationally driving connection with the rotor of the electric machine.

In a further preferred embodiment of the drivetrain according to the invention, the planetary-gear-set-side and/or rotor-side wheel is, in an exchangeable manner, in rotationally driving connection with the second element of the planetary gear set and/or with the rotor of the electric machine. In this embodiment, therefore, the transmission ratio between the rotor of the electric machine and the first element of the planetary gear set can be changed, in order to optimize the rotational speed and torque conditions of the electric machine for the starter and generator mode, by simply exchanging the planetary-gear-set-side and/or rotor-side wheel of the traction mechanism drive. On account of the good accessibility to the planetary gear set and to the electric machine, such an exchange can be carried out particularly quickly and easily.

To provide a transmission ratio between the rotor of the electric machine and the first element of the planetary gear set in the starter mode which necessitates only a small electric machine, the coupling arrangement between the rotor of the electric machine on the one hand and the second element of the planetary gear set on the other hand has, in the starter mode, in which the rotor functions as the drive input side and the second element functions as the drive output side, a transmission ratio which is greater than 1. This may be for example by means of a rotor-side wheel of the traction mechanism drive which has a smaller diameter than the planetary-gear-set-side wheel of the traction mechanism drive. It should be noted that this embodiment, on account of the favorable transmission ratio which is achieved, could in itself form an independent invention with significant advantages over the known drivetrain according to DE 101 02 015 A1, even if the planetary gear set is not arranged in front of the engine in the first axial direction. In this embodiment, it has also proven to be particularly advantageous for the stated transmission ratio to be equal to or greater than 2, particularly preferably equal to or greater than 3.

Alternatively or in addition to the embodiment described above, it is provided in a further advantageous embodiment of the drivetrain according to the invention that the coupling arrangement has, in the generator mode in which the second element of the planetary gear set forms the drive input side and the rotor of the electric machine forms the drive output side of the coupling arrangement between the rotor and the planetary gear set, a transmission ratio which is lower than 1, preferably equal to or lower than ½, particularly preferably equal to or lower than ⅓.

For the planetary gear set of the drivetrain, it has also proven to be advantageous for the planetary gear set, in the starter mode in which the second element forms the drive input side and the first element forms the drive output side f the planetary gear set, to have a transmission ratio which is greater than 2 and which is preferably in the range from 2.5 to 6, as is the case in a further advantageous embodiment of the drivetrain according to the invention.

According to a further particularly preferred embodiment of the drivetrain according to the invention, the overall transmission ratio between the rotor of the electric machine and the first element of the planetary gear set, which overall transmission ratio is defined for example by the above mentioned transmission ratio of the coupling arrangement and the transmission ratio of the planetary gear set, in the starter mode is in the range from 3 to 18, preferably 6 to 13, particularly preferably 9 to 10. Here, a particularly balanced design of the planetary gear set and of the coupling arrangement on the one hand and of the electric machine on the other hand was obtained in the latter range.

For the first actuating device, consideration is given fundamentally to any actuating device by means of which the third element of the planetary gear set can be fixed to the stationary housing, preferably the stationary engine housing. Correspondingly, for the second actuating device, consideration can be given to any actuating device which, in the generator mode, interacts with at least one of the elements of the planetary gear set in such a way that the planetary gear set performs a block rotation. To ensure particularly reliable functioning of the planetary gear set both in the generator mode and in the starter mode, it is provided in a further preferred embodiment of the drivetrain according to the invention that the first and/or second actuating device is a freewheel or a switchable clutch or brake. Here, a freewheel has the particular advantage that it can be integrated into the planetary gear set in a particularly space-saving manner, whereas the switchable clutch or brake has the advantage of particularly high reliability. Depending on the available installation space, therefore, it is also preferable in this embodiment if one actuating device is designed as a freewheel and the other actuating device is designed as a switchable clutch or brake. If at least one of the two actuating devices is designed as a clutch or brake, it has also proven to be advantageous for the clutch or brake to be designed as a multiplate clutch or brake.

In a further advantageous embodiment of the drivetrain according to the invention, the second actuating device, that is to say for example the freewheel, the switchable clutch or the switchable brake, is arranged between two elements of the three elements of the planetary gear set in such a way that said second actuating device fixes said two elements with respect to one another in the generator mode, and the planetary gear set thereby performs a block rotation. In this embodiment, therefore, the second actuating device may for example be arranged, or may act, between the sun gear and the planet gear carrier, between the planet gear carrier and the ring gear or between the sun gear and the ring gear.

In a further particularly advantageous embodiment of the drivetrain according to the invention, which constitutes an alternative to the embodiment described above, the second actuating device is arranged between the planet gear carrier and the planet gears in such a way that said planet gears are fixed with respect to the planet gear carrier in the generator mode and the planetary gear set thereby performs a block rotation. In this embodiment, it has proven to be particularly advantageous for the second actuating device to be formed by one or more freewheels instead of a switchable clutch or brake. In any case, a second actuating device which acts between the planet gear carrier and the planet gears ensures particularly reliable functioning of the planetary gear set in the generator mode of the electric machine.

To prevent a negative transmission ratio in the region of the planetary gear set, the first element of the planetary gear set, which is in rotationally driving connection with the engine shaft of the engine, is the planet gear carrier.

In a further advantageous embodiment of the drivetrain according to the invention, which is based on the embodiment described above, the first element is the planet gear carrier, the second element is the ring gear and the third element is the sun gear. In this embodiment, the second actuating device is arranged preferably between the second and third elements, that is to say the ring gear and the sun gear, or acts between said two elements.

To permit particularly high transmission ratios of the planetary gear set in the starter mode, it is provided in a further particularly preferred and alternative embodiment to the embodiment of the drivetrain according to the invention described above that the planetary gear set is designed such that the first element is the planet gear carrier, the second element is the sun gear and the third element is the ring gear. On account of the high transmission ratio of the planetary gear set which can be obtained in the starter mode, which allows the electric machine to be of particularly small dimensions, said embodiment could in itself form an independent invention with significant advantages over the known drivetrain according to DE 101 02 015 A1, even if the planetary gear set is not arranged in front of the engine in the first axial direction. In this embodiment, it is also preferable for the second actuating device to be arranged, or to act, between the first element, that is to say the planet gear carrier, and the second element, that is to say the sun gear.

BRIEF DESCRIPTION OF THE DRAWINGS

The invention is explained in more detail below on the basis of exemplary embodiments with reference to the appended drawings, in which.

DETAILED DESCRIPTION OF THE INVENTION

Figure 1:
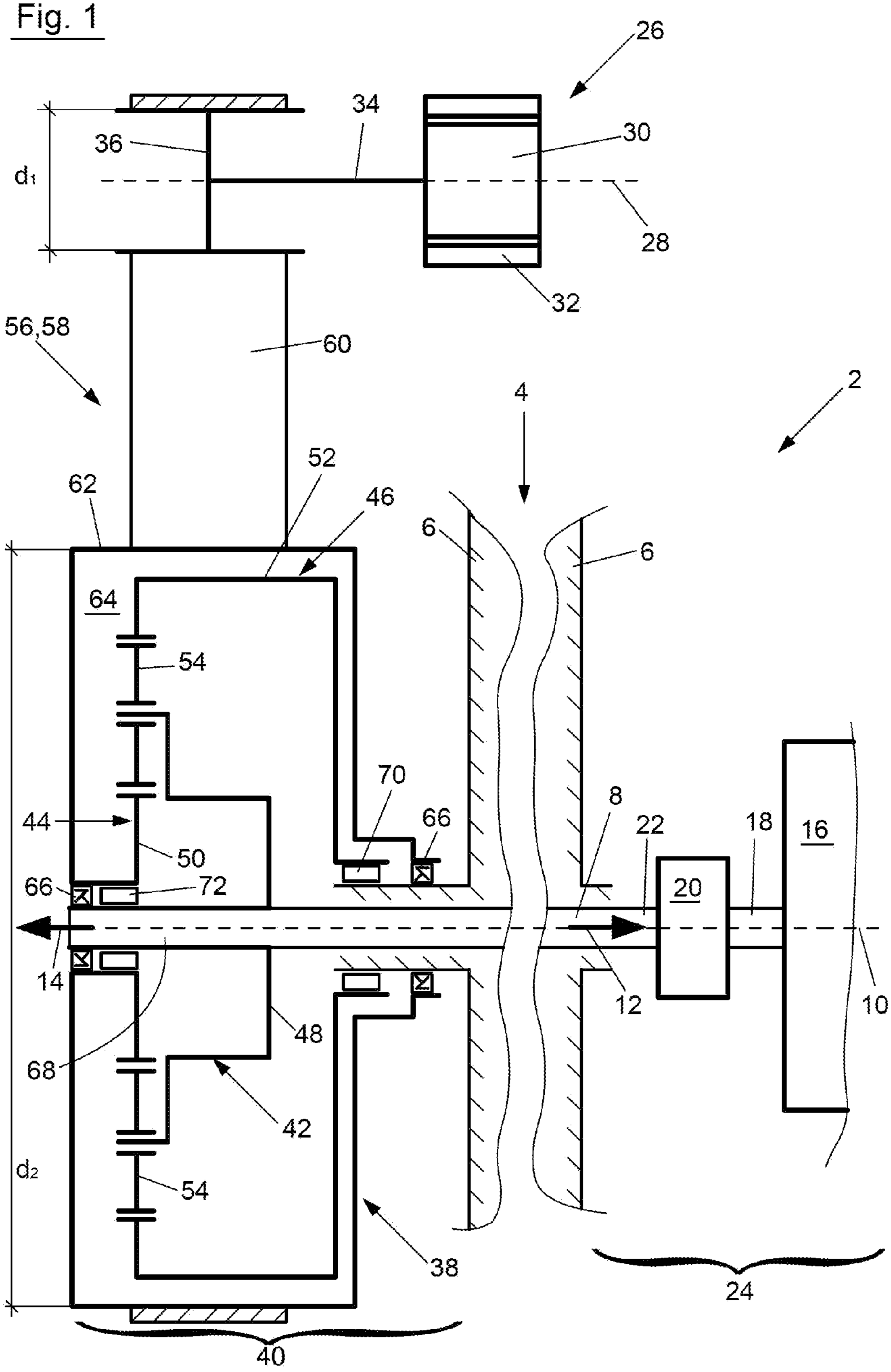
FIG. 1 shows a schematic illustration of a first embodiment of the drivetrain according to the invention in side view.

FIG. 1 shows a first embodiment of the drivetrain 2 according to the invention for a motor vehicle. The drivetrain 2 has an engine 4 which is designed in the present case as an internal combustion engine. FIG. 1 shows merely an engine housing 6 and a drivable engine shaft 8 of the engine 4. The engine shaft 8, which is rotatable about a rotational axis 10, extends at one side in a first axial direction 12 and at the other side in a second axial direction 14 opposite to the first axial direction 12.

The drivetrain 2 also comprises a transmission 16 which is merely schematically indicated in FIG. 1. The transmission 16 has a transmission input shaft 18 which is in rotationally driving connection with a first end 22 of the engine shaft 8 via a merely schematically indicated coupling arrangement 20, with the first end 22 of the engine shaft 8 pointing in the first axial direction 12. The transmission 16 and/or the coupling arrangement 20 are/is arranged behind the engine 4 in the first axial direction 12. It is also possible to say that the transmission 16 and/or the coupling arrangement 20 are/is arranged on the drive output side 24 of the engine 4.

The drivetrain 2 also comprises an electric machine 26 which is preferably designed as an alternator. Here, the electric machine 26 comprises a rotor 30, which is rotatable about a rotational axis 28, and a stator 32 which surrounds the rotor 30. The electric machine 26 may be operated either in a generator mode, in which electrical energy is generated utilizing a relative movement or rotation between the rotor 30 and the stator 32, or a starter mode in which electrical energy is converted into a rotation of the rotor 30 relative to the stator 32. The rotor 30 is in rotationally driving connection via a shaft 34, which extends along the rotational axis 28, with a rotor-side wheel 36 whose function will be explained in more detail further below. Here, the rotor-side wheel 36 is, in an exchangeable manner, in rotationally driving connection with the rotor 30 or the shaft 34, that is to say the rotor-side wheel 36 may be exchanged for another wheel which may if appropriate have a greater or smaller diameter.

The drivetrain 2 also has a planetary gear set 38. Here, the planetary gear set 38 is arranged in front of the engine 4 in the second axial direction 14. It is also possible to say here that the planetary gear set 38 is arranged on the control side 40, which faces away from the drive output side 24, of the engine 4. The planetary gear set 38 is composed substantially of three elements, specifically a first element 42 which is in rotationally driving connection with the engine shaft 8, a second element 44 which is in rotationally driving connection with the rotor 30 of the electric machine 26, and a third element 46. In the illustrated embodiment, the first element 42 is formed by a planet carrier 48, the second element 44 is formed by a sun gear 50 and the third element 46 is formed by a ring gear 52, with rotatable planet gears 54 being arranged on the first element 42 which is formed by the planet carrier 48.

The second element 44 of the planetary gear set 38 is rotatable about the rotational axis 10, while the rotor 30 of the electric machine 26, or the rotor-side wheel 36 which is assigned to the rotor 30, is rotatable about the rotational axis 28, with the rotational axis 28 being arranged offset with respect to the rotational axis 10 in the radial direction. The second element 44 and the rotor 30 are therefore not arranged coaxially. To nevertheless obtain a rotationally driving connection between the second element 44 and the rotor 30, a coupling arrangement 56 is also provided which, in the present example, is designed as a traction mechanism drive 58. Here, the traction mechanism drive 58 has a traction mechanism 60 which is designed preferably as a belt, such that the traction mechanism drive 58 may also be referred to as a belt drive. The traction mechanism 60 is wrapped firstly around the rotor-side wheel 36 and secondly around a planetary-gear-set-side wheel 62. Here, the planetary-gear-set-side wheel 62 is in rotationally driving connection with the second element 44 of the planetary gear set 38, with the planetary-gear-set-side wheel 62 preferably being formed in one piece with the second element 44 for this purpose. The rotationally driving connection between the second element 44 and the rotor 30 is thereby obtained by means of the traction mechanism drive 58, which therefore comprises the planetary-gear-set-side wheel 62, the traction mechanism 60 and the rotor-side wheel 36.

As shown in FIG. 1, the planetary-gear-set-side wheel 62 is designed so as to surround a closed lubricant chamber 64. Arranged within the lubricant chamber 64 are the first element 42 in the form of the planet gear carrier 48 with the planet gears 54, the second element 44 in the form of the sun gear 50, and the third element 46 in the form of the ring gear 52, with the lubricant chamber 64 also being sealed off with respect to the environment by means of corresponding seals 66, with it being possible for the seals 66 to be arranged for example between the planetary-gear-set-side wheel 62 and the engine shaft 8 or between the planetary-gear-side wheel 62 and a section of the engine housing 6.

The first element 42 is in rotationally driving connection with the second end 68 of the engine shaft 8, which second end 68 faces away from the first end 22 of the engine shaft 8 and projects out of the engine housing 6 in the axial direction 14. The planetary gear set 38 is therefore arranged outside the engine housing 6 on the control side 40 of the engine 4. Furthermore, the planetary gear set 38 together with the planetary-gear-set-side wheel 62 of the traction mechanism drive 58 is not arranged within a further housing which may if appropriate be fastened to the engine housing 4, such that the planetary gear set 38 is easily accessible and the traction mechanism 60 of the traction mechanism drive 58 can extend unhindered in the direction of the rotor-side wheel 36.

As already mentioned above, the electric machine 26 may be operated in a starter mode or in a generator mode. In the starter mode, the engine shaft 8 is driven by the electric machine 26 via the coupling arrangement 56 and the planetary gear set 38. Therefore, in the starter mode, the rotor-side wheel 36 forms the drive input side of the coupling arrangement 56 while the planetary-gear-set-side wheel 62 forms the drive output side of the coupling arrangement 56. Correspondingly, in the starter mode, the second element 44 of the planetary gear set 38 forms the drive input side of the planetary gear set 38, while the first element 42 of the planetary gear set 38 forms the drive output side of the planetary gear set 38.

In contrast, in the generator mode of the electric machine 26, the rotor 30 is driven by the engine shaft 8 via the planetary gear set 38 and the coupling arrangement 56. Consequently, in the generator mode, the first element 42 of the planetary gear set 38 forms the drive input side f the planetary gear set 38 while the second element 44 of the planetary gear set 38 forms the drive output side of the planetary gear set 38. Accordingly, in the generator mode, the planetary-gear-set-side wheel 62 forms the drive input side of the coupling device 56 while the rotor-side wheel 36 forms the drive output side of the coupling arrangement 56.

To obtain different transmission ratios of the planetary gear set 38 in the starter and generator modes, and to thereby make it possible to use a particularly small, space-saving, lightweight and cost-effective electric machine 26, a first actuating device 70 and a second actuating device 72 are also arranged in the planetary gear set 38. The first actuating device 70 serves, in the starter mode, to fix the third element 46, which in the present example is formed by the ring gear 52, to a stationary housing such that the third element 46 is no longer rotatable or is rotatable only to a limited extent, with the stationary housing being formed by the engine housing 6 of the engine 4 in the embodiment shown. In contrast, the second actuating device 72 interacts, in the generator mode, with at least one of the elements 42, 44, 46 in such a way that the planetary gear set 38 performs a block rotation, as a result of which the rotational speed of the drive output side of the planetary gear set 38 corresponds to the rotational speed of the drive input side of the planetary gear set 38. In the illustrated first embodiment according to FIG. 1, the second actuating device 72 is arranged between the first element 42 and the second element 44 of the planetary gear set 38, such that said elements 42, 44 are fixed relative to one another in the generator mode and are rotatable relative to one another in the starter mode. Alternatively, the second actuating device 72 could also be arranged, or act, between the engine shaft 8 and the second element 44.

The above mentioned actuating devices 70, 72 may for example be designed as freewheels or switchable clutches or brakes. If at least one of the actuating devices 70, 72 is designed as a switchable clutch or brake, it is preferable for the other actuating device 72, 70 to be designed as a freewheel. In the case of an actuating device 70, 72 in the form of a switchable clutch or brake, it is also preferable for said actuating device 70, 72 to be designed as a multiplate clutch or multiplate brake.

The coupling arrangement 56 has, in the starter mode in which the rotor-side wheel 36 forms the drive input side and the planetary-gear-set-side wheel 62 forms the drive output side of the coupling arrangement 56, a transmission ratio $i_{KS}$ which can be calculated according to the following formula:

$$i_{KG} = \frac{d_1}{d_2}$$

In the formula stated above, $d_1$ denotes the diameter of the rotor-side wheel 36 against which the traction mechanism 60 bears, while $d_2$ describes the diameter of the planetary-gear-set-side wheel 62 against which the traction mechanism 60 bears. The diameters $d_1$ and $d_2$ are selected here such that the transmission ration $i_{KS}$ of the coupling arrangement 56 in the starter mode is greater than 1, that is to say the diameter $d_1$ of the rotor-side wheel 36 is smaller than the diameter $d_2$ of the planetary-gear-set-side wheel 62. Here, it is preferable if $i_{KS} \geqq 2$. The diameters $d_1$ and $d_2$ are particularly preferably selected such that $i_{KS} \geqq 3$. Conversely, the transmission ratio $i_{KG}$ of the coupling arrangement 56 in the generator mode is lower than 1, preferably equal to or lower than ½, particularly preferably equal to or lower than ⅓, with the transmission ratio $i_{KG}$ of the coupling arrangement 56 in the generator mode being calculated according to the following formula:

$$i_{KG} = \frac{d_1}{d_2}$$

On account of the above mentioned transmission ratio is $i_{KS}$ or $i_{KG}$ of the coupling arrangement 56 in the starter mode or generator mode respectively, it is possible to use a particularly small electric machine 26, as a result f which installation space can be saved and a lower overall weight of the drivetrain 2 can be obtained. A further reduction in the weight of the electric machine 26 and of the installation space required for the electric machine 26 may furthermore be obtained by means of the planetary gear set 38 which is connected upstream in the generator mode and downstream in the starter mode, as will be explained in more detail below.

In the generator mode of the electric machine 26, the rotor 30 is driven by the engine shaft 8 via the planetary gear set 38 and the coupling arrangement 56, with the second actuating device 72 serving to fix the first element 42 and the second element 44 of the planetary gear set 38 relative to one another such that the planetary gear set 38 performs a block rotation. The following equation therefore applies for the transmission ratio $i_{PG}$ of the planetary gear set 38 in the generator mode:

$$i_{PG}=1.$$

Furthermore, the transmission ratio $i_{PS}$ of the planetary gear set 38 in the starter mode can be calculated according to the following formula:

$$i_{PS}=1+\frac{Z_H}{Z_S},$$

where $Z_H$ denotes the number of teeth of the ring gear 52, which forms the third element 46, while $Z_S$ denotes the number of teeth of the sun gear 50 which forms the second element 44. In this embodiment, the numbers of teeth $Z_H$ and $Z_S$ are selected such that the transmission ratio $i_{PS}$ of the planetary gear set 38 in the starter mode is greater than 2 and preferably in the range from 2.5 to 6. It is therefore the case that $$i_{PS}>2$$

and preferably that $$2.5\leqq i_{PS}\leqq 6.$$

The overall transmission ratio $i_{GS}$ in the starter mode between the rotor 30 of the electric machine 26 on the one hand and the first element 42 of the planetary gear set 38 or the engine shaft 8 of the engine 4 on the other hand can accordingly be calculated according to the following formula:

$$i_{GS}=i_{KS}\cdot i_{PS}.$$

For the overall transmission ratio $i_{GS}$, it is preferably the case that $$3\leqq i_{GS}18,$$

and particularly preferably that $$6\leqq i_{GS}\leqq 13$$

or that $$9\leqq i_{GS}\leqq 10.$$

To obtain a corresponding overall transmission ratio $i_{GS}$ in the starter mode, the transmission ratio $i_{KS}$ of the coupling arrangement 56 in the starter mode and the transmission ratio $i_{PS}$ of the planetary gear set 38 in the starter mode should be correspondingly coordinated with one another.

The mode of operation of the drivetrain 2 in the first embodiment according to FIG. 1 will be described below, wherein it should be assumed that $$i_{KS}=3,\ i_{KG}=⅓,\ i_{PS}=3 \text{ and } i_{PG}=1.$$

In the generator mode, the engine shaft 8 is driven by the engine 4 and the second actuating device 72 serves to fix the first element 42 and the second element 44 of the planetary gear set 38 with respect to one another, such that the planetary gear set 38 performs a block rotation, while the first actuating device 70 is set such that the third element 46 can rotate relative to the engine housing 6 and is therefore not fixed to said engine housing 6. The overall transmission ratio $i_{GG}$ in the generator mode can therefore be calculated as follows:

$$i_{GG}=i_{PG}\cdot i_{KG}=1\cdot⅓=⅓.$$

Consequently, the rotor 30 of the electric machine 26 is rotated at three times the rotational speed of the engine shaft 8 or of the first element 42 of the planetary gear set 38 when the electric machine 26 is operated in the generator mode.

In the starter mode of the electric machine 26, in which the electric machine 26 accordingly functions as a starter for the engine 4 such that a separate starting device can be dispensed with, the third element 46 of the planetary gear set 38 is fixed to the stationary engine housing 6 by means of the first actuating device 70, such that the third element 46 can no longer rotate or can rotate only to a restricted extent, while the second actuating device 72 acts between the first element 42 and the second element 44 of the planetary gear set 38 in such a way that said two elements 42, 44 can be rotated relative to one another. The first and second elements 42, 44 of the planetary gear set 38 are therefore no longer fixed relative to one another. The overall transmission ratio $i_{GS}$ between the rotor 30 of the electric machine 26 on the one hand and the first element 42 of the planetary gear set 38 or the engine shaft 8 which is to be driven by the electric machine 26 can therefore be calculated as:

$$i_{GS}=i_{KS}\cdot i_{PS}=3\cdot 3=9.$$

On the basis of the calculated overall transmission ratios $i_{GG}$ and $i_{GS}$ in the generator mode and in the starter mode, it can be seen that different overall transmission ratios $i_{GG}$ and $i_{GS}$ can be obtained as a function of the selected operating mode of the electric machine 26 without an additional starting device being required. Here, in particular in the starter mode, overall transmission ratios $i_{GS}$ are realized which result in rotational speed or torque ratios which enable the use of a particularly simple, small and lightweight electric machine 26, especially since the torque ratios are definitive for the size of the electric machine 26 and of the associated power electronics and battery of the electric machine 26. Furthermore, the mounting and maintenance expenditure for the planetary gear set 38 and for the electric machine 26 are considerably reduced, especially since the planetary gear set 38 is arranged on the control side 40 of the engine 4 while the electric machine 26 can be arranged in a particularly flexible manner on account of the coupling arrangement 56. Therefore, both the planetary gear set 38 and also the electric machine 26 are particularly easily accessible. Also, by exchanging the rotor-side wheel 36, it is possible in a particularly simple manner to set the torque ratios to the desired value, which makes the use of a small electric machine 26 possible.

A second embodiment of the drivetrain 2 according to the invention will be described below with reference to FIG. 2, with it being sought to discuss only the differences in relation to the first embodiment according to FIG. 1, with the same reference symbols being used for identical or similar parts, and with the above description otherwise applying correspondingly.

Figure 2:
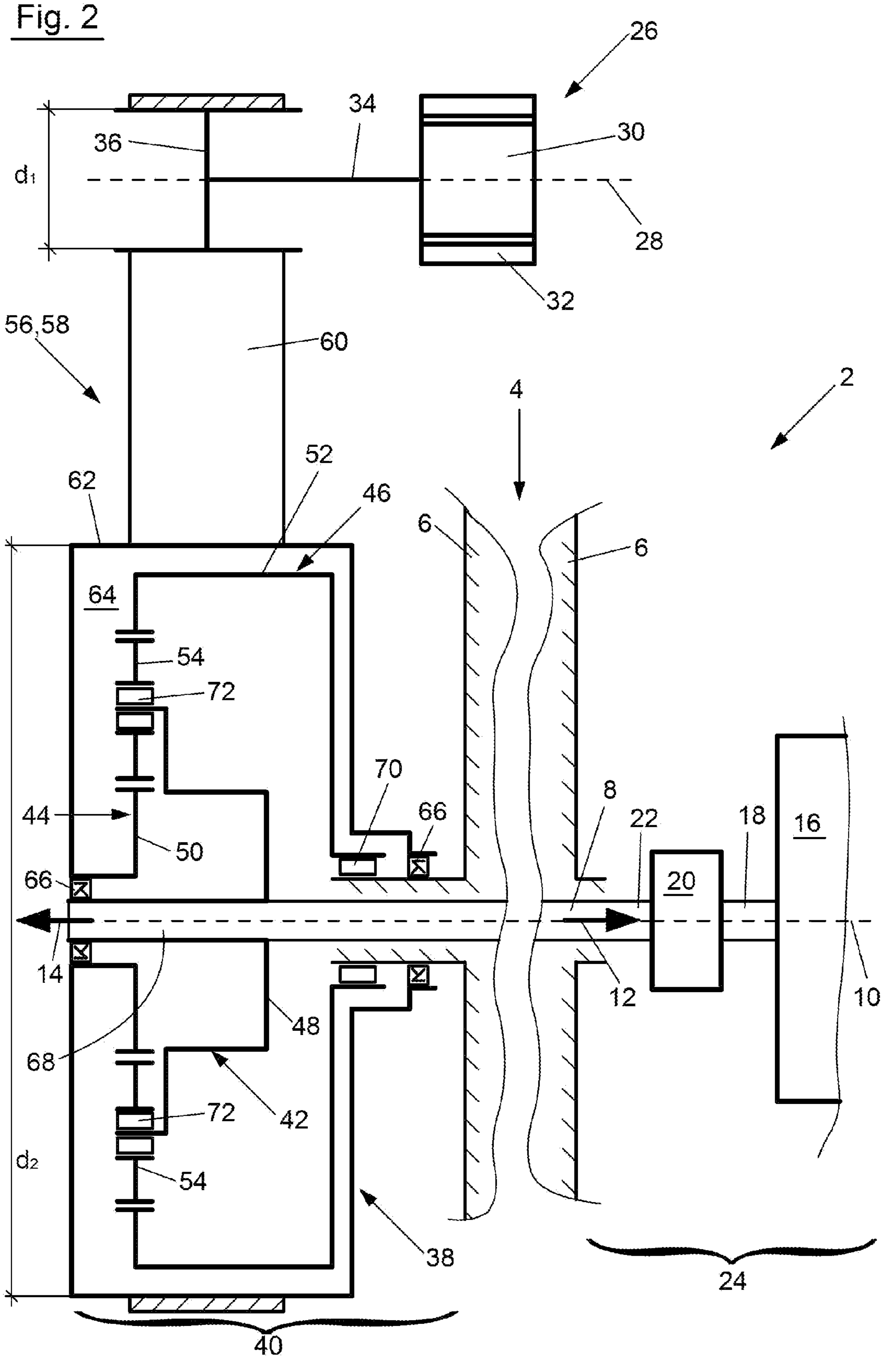
FIG. 2 shows a schematic illustration of a second embodiment of the drivetrain according to the invention in side view.

In the second embodiment of the drivetrain 2 according to FIG. 2, the second actuating device 72 is not arranged between the first element 42 and the second element 44 of the planetary gear set 38 but rather acts between the planet gear carrier 48 and the planet gears 54 which are arranged on the planet gear carrier 48, that is to say the second actuating device 72, which for this purpose may be of multi-part design, interacts only with the first element 42 of the planetary gear set 38, in such a way that the planetary gear set 38 performs a block rotation in the generator mode of the electric machine 26. In this embodiment, it is advantageous for the second actuating device 72 to be designed as a freewheel, preferably as a sleeve-type freewheel, and not to be formed by a switchable coupling or brake.

A third embodiment of the drivetrain 2 according to the invention will be described below with reference to FIG. 3, with only the differences in relation to the first embodiment being discussed below, with the same reference symbols being used for identical or similar parts, and with the above description otherwise applying correspondingly.

Figure 3:
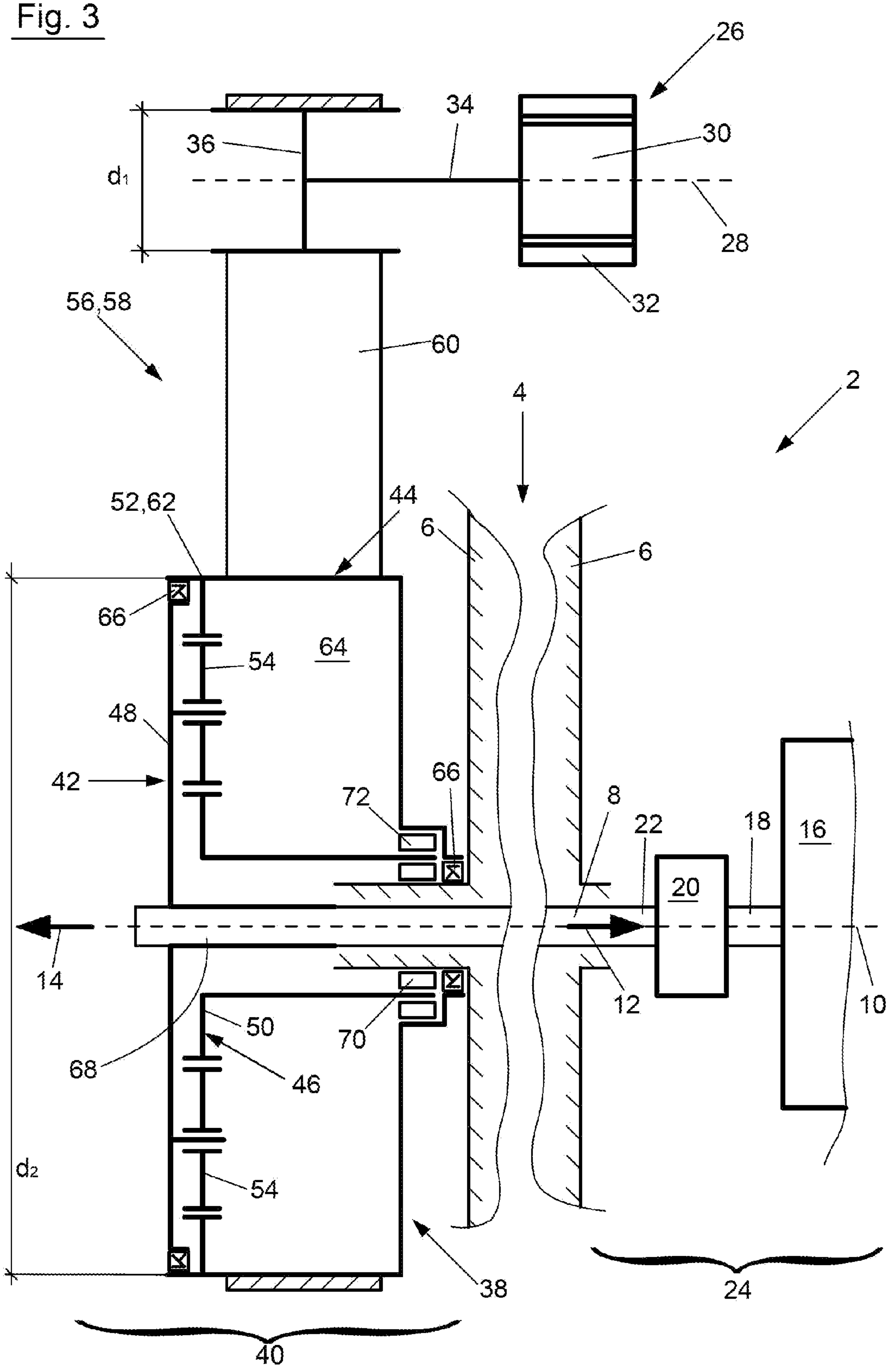
FIG. 3 shows a schematic illustration of a third embodiment of the drivetrain according to the invention in side view.

In the third embodiment according to FIG. 3, the second element 44 of the planetary gear set 38 is formed by the ring gear 52 while the third element 46 of the planetary gear set 38 is formed by the sun gear 50. Here, the second actuating device 72 is arranged, or acts, between the second element 44 in the form of the ring gear 52 and the third element 46 in the form of the sun gear 50. Since the ring gear 52, which forms the second element 44 of the planetary gear set 38, now constitutes the drive output side of the planetary gear set 38 in the generator mode and forms the drive input side of the planetary gear set 38 in the starter mode, the planetary-gear-set-side wheel 62 is consequently in rotationally driving connection with the ring gear 52, with the planetary-gear-set-side wheel 62 being formed in one piece with the ring gear 52 in the illustrated third embodiment. The overall transmission ratio $i_{GS}$ in the starter mode is again significantly dependent on the transmission ratio $i_{KS}$ of the coupling arrangement 56 and on the transmission ratio $i_{PS}$ of the planetary gear set 38, as has already been explained above with reference to the corresponding formula. In contrast to the two above-described embodiments according to FIGS. 1 and 2, the transmission ratio $i_{PS}$ of the planetary gear set 38 in the starter mode is however calculated according to the following formula:

$$i_{PS} = 1 + \frac{Z_S}{Z_H}.$$

It is clear from this that, in this third embodiment, only a low transmission ratio $i_{PS}$ of the planetary gear set 38 can be obtained in the starter mode, which transmission ratio lies in the following range:

$$1 < i_{PS} < 2.$$

especially since the number of teeth $Z_S$ of the sun gear 50 is always smaller than the number of teeth $Z_H$ of the ring gear 52.

Despite said restriction, the overall transmission ratio $i_{GS}$ in the starter mode may however still lie in one of the above-mentioned preferred ranges by virtue of the coupling arrangement 56 being designed in a corresponding way, which may be realized by means of an adaptation of the transmission ratio $i_{KS}$ of the coupling arrangement 56 in the starter mode. It is therefore possible to obtain the advantages of the invention with the third embodiment, too, even though there is a certain restriction from a design aspect, which may be undesirable depending on the application, with the restricted selection of the transmission ratio $i_{PS}$ of the planetary gear set 38 in the starter mode. In this respect, priority should be given to the two above-described embodiments according to FIGS. 1 and 2.

A fourth embodiment of the drivetrain 2 according to the invention will be described below with reference to FIG. 4, with the fourth embodiment substantially corresponding to the third embodiment according to FIG. 3, such that only the differences will be discussed below, with the same reference symbols being used for identical or similar parts, and with the above description otherwise applying correspondingly.

Figure 4:
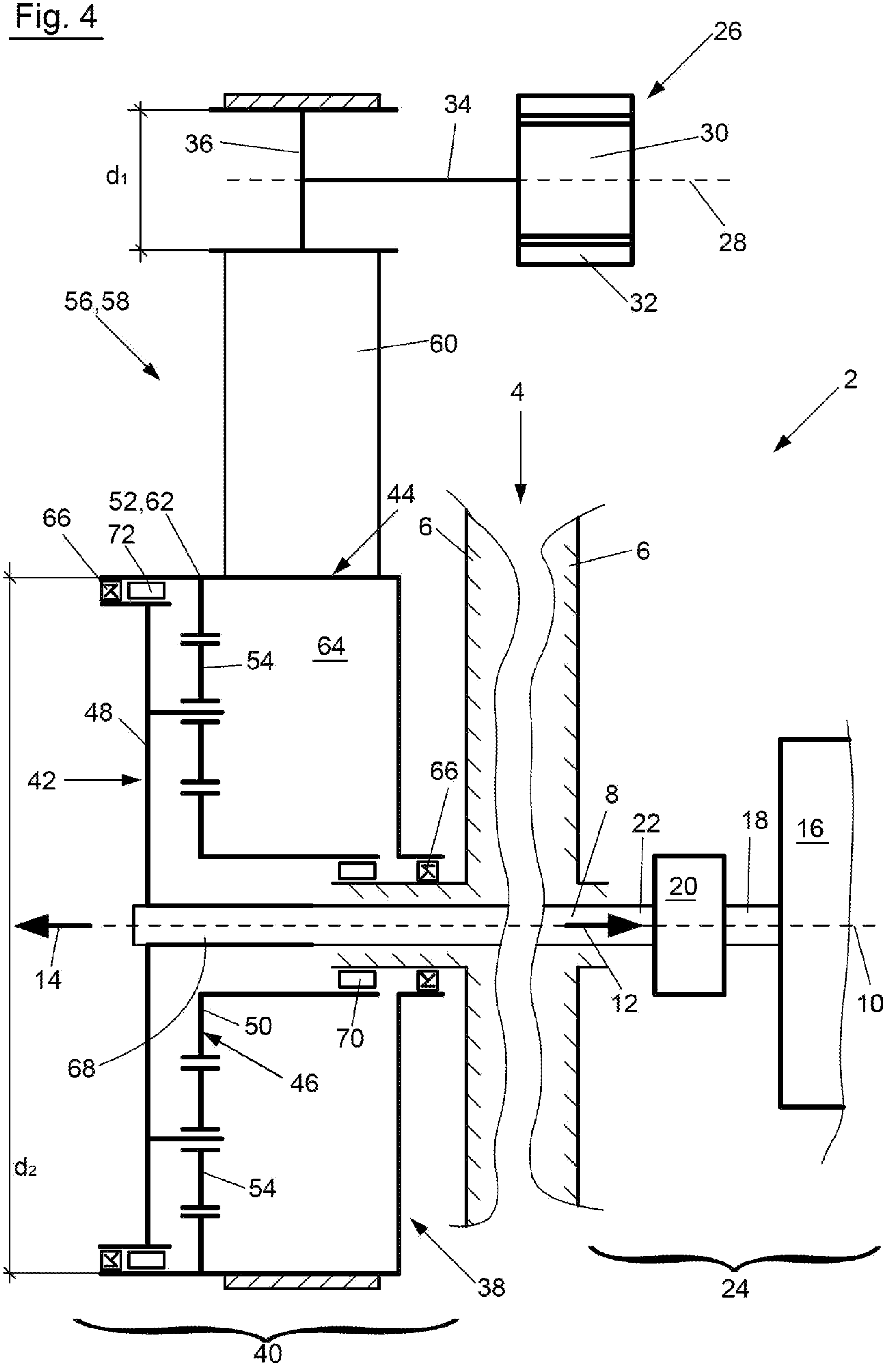
FIG. 4 shows a schematic illustration of a fourth embodiment of the drivetrain according to the invention in side view.

In contrast to the third embodiment, the second actuating device 72 in the fourth embodiment of the drivetrain 2 according to FIG. 4 is arranged, or acts, between the first element 42 in the form of the planet gear carrier 48 and the second element 44 in the form of the ring gear 52. The above description otherwise applies correspondingly.

The description of the invention is merely exemplary in nature and, thus, variations that do not depart from the gist of the invention are intended to be within the scope of the invention. Such variations are not to be regarded as a departure from the spirit and scope of the invention.

I claim:

1. A drivetrain for a motor vehicle, having an engine which has a drivable engine shaft with a first axial direction, having a transmission which has a transmission input shaft in rotationally driving connection with the engine shaft, having an electric machine which has a rotor and a stator and which can be operated in a generator mode, in which electrical energy can be generated utilizing a relative movement between the rotor and the stator, and a starter mode in which electrical energy can be converted into a relative movement between the rotor and the stator, and having a planetary gear set which has three elements, specifically a sun gear, a planet gear carrier with planet gear carriers, and a ring gear, of which a first element which forms a drive input side of the planetary gear set in the generator mode and forms a drive output side of the planetary gear set in the starter mode, is in rotationally driving connection with the engine shaft, a second element, which forms a drive output side of the planetary gear set in the generator mode and forms a drive input side of the planetary gear set in the starter mode, is in rotationally driving connection with the rotor and a third element can be fixed by means of a first actuating device to a stationary housing in the starter mode, with a second actuating device also being provided which, in the generator mode, interacts with at least one of the elements in such a way that the planetary gear set performs a block rotation, wherein the planetary gear set is arranged in front of the engine in the second axial direction and the transmission is arranged behind the engine in the first axial direction and wherein the second element and the rotor are not arranged coaxially and are in rotationally driving connection with one another via a traction mechanism, and wherein the second element forms a closed lubricant chamber within which the elements of the planetary gear set are arranged and wherein the traction mechanism is wrapped about a wheel rotationally driving connection with the rotor.

2. The drivetrain as claimed in claim 1, wherein the transmission input shaft is in rotationally driving connection with a first end of the engine shaft and the first element is in rotationally driving connection with the second end, which faces away from the first end, of the engine shaft.

3. The drivetrain as claimed in claim 1, wherein the engine has an engine housing, with the planetary gear set being arranged outside the engine housing.

4. The drivetrain as claimed in claim 3, wherein the third element is fixed by means of the first actuating device to the engine housing in the starter mode.

5. The drivetrain as claimed in claim 1, wherein the coupling arrangement has, in the starter mode, a transmission ratio which is greater than 2, and in the generator mode, a transmission ratio which is lower than ⅓.

6. The drivetrain as claimed in claim 5, wherein the overall transmission ratio between the rotor and the first element in the starter mode is in the range from 9 to 10.

7. The drivetrain as claimed in claim 1, wherein the planetary gear set has, in the starter mode, a transmission ratio which is greater than 2.

8. The drivetrain as claimed in claim 1, wherein the second actuating device is arranged between two elements of the three elements of the planetary gear set in such a way that said elements are fixed with respect to one another in the generator mode.

9. The drivetrain as claimed in claim 1, wherein the second actuating device is arranged between the planet gear carrier and the planet gears in such a way that the planet gears are fixed with respect to the planet gear carrier in the generator mode.

10. The drivetrain as claimed in claim 1, wherein the first element is the planet gear carrier, the second element is the ring gear and the third element is the sun gear, with the second actuating device being arranged between the second and third elements.

11. The drivetrain as claimed in claim 1, wherein the first element is the planet gear carrier, the second element is the sun gear and the third element is the ring gear, with the second actuating device being arranged between the first and second elements.

* * * * *